United States Patent Office 3,455,917
Patented July 15, 1969

3,455,917
PHENTHIAZINE DERIVATIVES
Daniel Farge, Thiais, Claude Jeanmart, Brunoy, and Mayer Naoum Messer, Sceaux, France, assignors to Rhone-Poulenc S.A., Paris, France, a French body corporate
No Drawing. Filed Oct. 28, 1966, Ser. No. 590,201
Claims priority, application France, Oct. 29, 1965, 36,782; Aug. 24, 1966, 74,008
Int. Cl. C07d *93/14*; A61k *9/02*
U.S. Cl. 260—243    8 Claims

ABSTRACT OF THE DISCLOSURE

The invention provides new 3-hydroxyalkylphenthiazines, optionally substituted in the 7 and 10 positions, and esters and carbamates thereof, useful as anti-inflammatory and anti-rheumatic agents.

---

This invention relates to new therapeutically useful phenthiazine derivatives, to processes for their preparation and pharmaceutical compositions containing them.

The new phenthiazine derivatives of the present invention are those of the general formula:

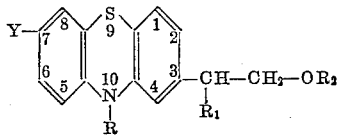

wherein R represents a hydrogen atom or a methyl group, $R_1$ represents a hydrogen atom or a methyl or ethyl group, $R_2$ represents a hydrogen atom, or an alkanoyl or alkenoyl group containing 1 to 4 carbon atoms, which can optionally carry a carboxy substituent, or a carbamoyl, alkylcarbamoyl, dialkylcarbamoyl, alkoxycarbonyl or 4-alkyl-1-piperazinylcarbonyl group containing 1 to 4 carbon atoms in the alkyl or alkoxy radicals, Y represents a hydrogen or halogen atom or a methyl, ethyl or methoxy group, and where $R_2$ represents an alkanoyl or alkenoyl group with a carboxy substituent pharmaceutically-acceptable salts thereof.

These new phenthiazine compounds possess useful pharmacodynamic properties; they are particularly useful as anti-inflammatory, anti-rheumatic and analgesic agents and have given good results in physiological tests on animals in doses of from 10 mg. to 100 mg. per kilogramme of animal body weight. Preferred compounds are those in which $R_1$ represents a hydrogen atom or a methyl group, $R_2$ represents a hydrogen atom or an alkanoyl group carrying a carboxy substituent, or an alkoxycarbonyl, carbamoyl, dialkylcarbamoyl or 4-alkyl-1-piperazinylcarbonyl group, and Y represents a hydrogen atom or a methoxy group and, more particularly, those wherein R and $R_1$ are the same or different and each represents a hydrogen atom or a methyl group, $R_2$ represents a hydrogen atom, an alkanoyl group carrying a carboxy substituent, or an alkoxycarbonyl group, and Y represents a hydrogen atom or a methoxy group. Of outstanding importance are 1-(10-methyl-3-phenthiazinyl)-2-hydroxyethane, 2-(10-methyl-3-phenthiazinyl)ethyl acid succinate, 2-(10-methyl-3-phenthiazinyl)propyl acid succinate, 1-(3-phenthiazinyl) - 2-hydroxyethane and 1-(10-methyl-3-phenthiazinyl)-2-ethoxycarbonyloxyethane.

According to a feature of the invention, the phenthiazine derivatives of Formula I in which $R_2$ represents a hydrogen atom are prepared by reduction of esters of the general formula:

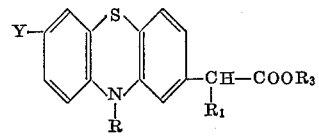

wherein R, $R_1$ and Y are as hereinbefore defined, and $R_3$ represents an alkyl group containing 1 to 4 carbon atoms, by methods known per se for reducing an esterified carboxyl group to hydroxymethyl. Preferably, the reduction is carried out by means of a metallic hydride, such as lithium aluminium hydride, in an inert organic solvent such as an ether, e.g. diethyl ether, at a temperature between room temperature and the boiling temperature of the solvent.

Phenthiazine derivatives of Formula II may be prepared by esterification by methods known per se of the corresponding acids of the general formula:

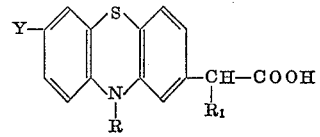

wherein R, $R_1$ and Y are as previously defined.

When $R_1$ represents a hydrogen atom, the phenthiazine derivatives of Formula III may be prepared, for example, by the method described by S. P. Massie et coll., J. Org. Chem., 21, 1006 (1956), for the preparation of 3-phenthiazinylacetic acid, i.e. by subjecting ketones of the general formula:

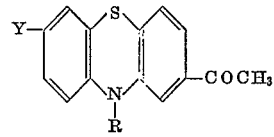

wherein R and Y are as hereinbefore defined, to a Willgerodt reaction followed by hydrolysis of the amides or thioamides thus formed.

When $R_1$ represents a methyl or ethyl group, the phenthiazine derivatives of Formula III may be prepared by simultaneous hydrolysis and decarboxylation of phenthiazine derivatives of the general formula:

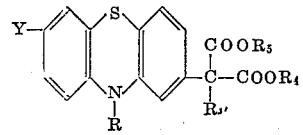

wherein R and Y are as previously defined, $R_{1'}$ represents a methyl or ethyl group, and $R_4$ and $R_5$ represent alkyl groups containing 1 to 4 carbon atoms. This reaction is performed by the usual methods of simultaneous hydrolysis and decarboxylation of malonic esters: advantageously, sodium hydroxide is employed as the reagent and ethanol as solvent.

Phenthiazine derivatives of Formula V may be obtained by the action of a reactive ester of the general formula:

$$X—R_{1'} \qquad VI$$

wherein $R_{1'}$ is as hereinbefore defined and X represents the acid residue of a reactive ester, for example a halogen atom or a sulphuric ester residue (e.g. methoxysulphonyloxy) or a sulphonic ester residue (e.g. methanesulphonyloxy or toluene-p-sulphonyloxy), on a phenthiazine derivative of the general formula:

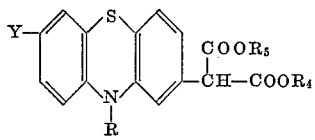

VII wherein R, Y, R₄ and R₅ are as hereinbefore defined.

This reaction is carried out by methods known per se for alkylating malonic esters, i.e. by operating in the presence of a basic condensing agent such as an alkali metal alcoholate, an alkali metal amide or an alkali metal, in an organic solvent such as benzene, toluene, ethanol or diethyl ether.

Phenthiazine derivatives of the general Formula VII may be prepared from phenthiazine derivatives of the general formula:

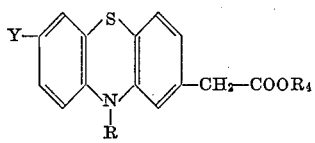

VIII wherein R, Y and R₄ are as hereinbefore defined, either directly by the action of an alkyl carbonate of the general formula:

    IX wherein R₅ is as hereinbefore defined, or by the action of an alkyl oxalate of the general formula:

    X wherein R₅ is as hereinbefore defined, followed by a decarbonylation.

In accordance with other feature of the invention, the phenthiazine derivatives of Formula I in which R₂ represents an alkanoyl, alkenoyl or carbamoyl radical, which radicals may optionally be substituted as hereinbefore indicated, or a 4-alkyl-1-piperazinylcarbonyl radical, are prepared by esterification or carbamoylation, by methods known per se, of phenthiazine derivatives of Formula I in which R₂ represents a hydrogen atom.

Esterification is carried out, more particularly, by means of a halide or an anhydride of an alkanoic or alkenoic acid containing 1 to 4 carbon atoms optionally having a second carboxyl group. Preferably, the operation is carried out in an inert organic solvent such as an aromatic hydrocarbon (e.g. benzene or toluene) in the presence or absence of a condensing agent such as pyridine.

Carbamoylation is advantageously effected by first reacting phosgene with a phenthiazine derivative of Formula I in which R₂ represents a hydrogen atom to obtain a chloroformate of the general formula:

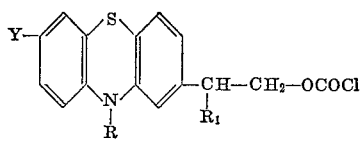    XI wherein R, R₁ and Y are as hereinbefore defined, and converting the chloroformate into the desired carbamate by the action of ammonia, an alkylamine, dialkylamine or a 1-alkylpiperazine. Carbamoylation may also be carried out by the action of isocyanic acid or an alkyl isocyanate, by the action of a carbamoyl halide or by the action of an alkyl carbamate. The operation is perferably carried out in an aromatic hydrocarbon solvent medium (e.g. benzene, toluene or xylene) at room temperature or, more rapidly, at the boiling temperature of the solvent.

Phenthiazine derivatives of Formula I in which R₂ represents an alkoxycarbonyl group are prepared by reacting an alkyl chloroformate of the general formula:

$$Cl—CO—OR_{2'}$$    XII wherein R₂' represents an alkyl group containing 1 to 4 carbon atoms, with a phenthiazine derivative of Formula I in which R₂ represents a hydrogen atom.

The phenthiazine derivatives of Formula I in which R₂ represents an alkanoyl or alkenoyl group carrying a carboxy substituent may be converted into metallic salts or salts with a nitrogenous base by application of methods known per se. Thus, such salts may be obtained by the action of an alkali metal or alkaline earth metal base, ammonia or an amine on the aforesaid phenthiazine derivative of Formula I in an appropriate solvent such as an alcohol, an ether, a ketone or water. The salt formed is precipitated, if necessary after concentration of its solution, and is separated by filtration or decantation.

For therapeutic purposes the phenthiazine derivatives of Formula I are employed as such and, in the case where R₂ represents an alkanoyl or alkenoyl group carrying a carboxy substituent, in the form of pharmaceutically-acceptable salts, i.e. salts which are non-toxic to the animal organism in therapeutic doses of the salts. Examples of pharmaceutically-acceptable salts are the alkali metal (such as sodium, potassium and lithium) salts, the alkaline earth metal salts and the ammonium salt.

By the term "methods known per se" as used in this specification and accompanying claims is meant methods hereinbefore used or described in the chemical literature.

The following examples illustrate the invention.

EXAMPLE I

To a suspension of lithium aluminium hydride (1.6 g.) in anhydrous diethyl ether (120 cc.) is added over a period of 150 minutes a solution of methyl (10-methyl-3-phenthiazinyl) acetale (11.4 g.) in anhydrous diethyl ether (450 cc.). Thereafter there are added successively water (4 cc.), 2 N sodium hydroxide (10 cc.) and water (20 cc.), and the ther is then decanted. The organic solution is washed with water until the washing liquors are neutral, dried over anhydrous sodium sulphate and the solvent evaporated. The residue (9.2 g.) is recrystallised from a mixture of benzene and cyclohexane (1:1 by volume) to give 1-(10-methyl-3-phenthiazinyl)-2-hydroxyethane (4 g.), M.P. 112–113° C.

Methyl (10-methyl-3-phenthiazinyl)acetate employed as starting material is prepared by reacting methanol (10 g.) with (10-methyl-3-phenthiazinyl)acetic acid (27.1) in 1,2-dichloroethane (30 cc.) in the presence of methanesulphonic acid (1.5 cc.). After heating under reflux for 30 minutes, the reaction mixture is allowed to cool and methylene chloride 250 cc.) is added. The organic phase is decanted, washed with a saturated aqueous sodium bicarbonate solution (100 cc.) and water (100 cc.) and then dried over anhydrous sodium sulphate. After evaporation of the solvent, there is obtained a crystalline residue which is triturated in the cold in cyclohexane (50 cc.). The crystals are filtered off and washed with petroleum ether (50 cc.) to give methyl (10-methyl-3-phenthiazinyl)acetate (25.6 g.), M.P. 100–101° C.

(10-methyl-3-phenthiazinyl)acetic acid is prepared in the following way:

A mixture of 10-methyl-3-acetylphenthiazine (43.9 g.), sulphur (8.8 g.) and morpholine (100 cc.) is heated under reflux for 16 hours. The reaction mixture is then poured into ethanol (750 cc.) and a product crystallises. The crystals are filtered off and washed with ethanol (100 cc.) and then with petroleum ether (200 cc.) to give (10-methyl - 3 - phenthiazinyl)acetothiomorpholide (52.5 g.), M.P. 185–187° C.

A mixture of (10-methyl - 3 - phenthiazinyl)acetothiomorpholide (52.5 g.), potassium hydroxide (85%; 88 g.) and ethanol (750 cc.) is heated under reflux for 16 hours, concentrated to dryness under a pressure of 20 mm. Hg, and the residue is taken up with water (1 litre). The solution obtained is treated with decolorising charcoal (10 g.), filtered, and the filtrate is acidified with hydrochloric acid ($d=1.19$; 120 cc.). A product precipitates. The crystals are filtered off and washed with water (750 cc.) to give a product (36 g.) melting at 140° C., which is recrystallised from benezene (100 cc.) and yields a product (25.5 g.) melting at 145° C. After recrystallisation from benzene (120 cc.), there is finally obtained (10-methyl-3-phenthiazinyl)acetic acid (21.4 g.), M.P. 146° C.

10-methyl-3-acetylphenthiazine is prepared in accordance with G. Cauquil and A. Casadevall, Bull. Soc. Chim., p. 768 (1955).

EXAMPLE II

To a suspension of lithium aluminium hydride (4 g.) in anhydrous diethyl ether (300 cc.) is added over a period of 10 minutes a solution of methyl 2-(10-methyl-3-phenthiazinyl)propionate (29.9 g.) in an hydrous diethyl ether (300 cc.), and the mixture is heated under reflux for two hours. There are then added successively water (10 cc.), 2 N sodium hydroxide (25 cc.) and water (50 cc.). After stirring for two hours, the ether is decanted, and the organic solution is washed with water until the washing liquors are neutral, dried over anhydrous sodium sulphate and the solvent is evaporated. The oily residue (23.2 g.) is chromatographed through a column ($d=3.5$ cm.) of alumina (348 g.). The product is fixed in solution in cyclohexane containing 10% of benzene (1150 cc.) and eluted with a 1:1 (by volume) mixture of benzene and ethyl acetate (3200 cc.). The solvent is evaporated under reduced pressure (40 mm. Hg) to give 2-(10-methyl-3-phenthiazinyl)-1-hydroxypropane (20.7 g.) in the form of a lacquer.

Methyl 2-(10-methyl-3-phenthiazinyl)propionate employed as starting material is prepared in the following way:

A mixture of 2-(10-methyl-3-phenthiazinyl)propionic acid (72.9 g.), methanol (24.6 g.), methanesulphonic acid (3.6 cc.) and 1,2-dichloroethane (75 cc.) is heated under reflux for 1 hour. A saturated aqueous sodium bicarbonate solution (100 cc.) and methylene chloride (550 cc.) are then added. The organic phase is decanted, washed with water (450 cc.), treated with decolorising charcoal (20 g.), filtered, dried over anhydrous sodium sulphate and evaporated. A crystalline residue (73 g.) is obtained, which is recrystallised from boiling cyclohexane (250 cc.) to yield methyl 2-(10-methyl-3-phenthiazinyl)propionate (64.5 g.), M.P. 70–71° C.

2 - (10-methyl-3-phenthiazinyl)propionic acid (M.P. 144° C.; 8.1 g.) may be prepared by heating methyl ethyl methyl (10-methyl-3-phenthiazinyl)malonate (25.6 g.) in ethanol under reflux in the presence of N sodium hydroxide (138 cc.).

Methyl ethyl methyl (10-methyl-3-phenthiazinyl)malonate (25.6 g.) is prepared by the action of methyl iodide (12.9 g.) on methyl ethyl (10-methyl-3-phenthiazinyl)malonate (27 g.) in the presence of sodium ethoxide.

Methyl ethyl (10 - methyl-3-phenthiazinyl)malonate (M.P. 120° C.; 27.2 g.) is obtained by the action of ethyl carbonate (73 g.) on methyl (10-methyl-3-phenthiazinyl)acetate (25 g.) in ethanol.

EXAMPLE III

A mixture of 1-(10-methyl-3-phenthiazinyl)-2-hydroxyethane (18.8 g.) and succinic anhydride (8 g.) is heated for 150 minutes at an internal temperature between 90° and 110° C. After cooling, the reaction mixture is taken up with 0.5 N sodium hydroxide (200 cc.). The solution is washed with diethyl ether, and N hydrochloric acid (100 cc.) is added. An oil separates, which is extracted with diethyl ether. The ethereal solution is dried over anhydrous sodium sulphate and the solvent is evaporated. The residue (16.5 g.) is recrystallised twice in succession from acetonitrile to give 2-(10-methyl-3-phenthiazinyl) ethyl acid succinate (6.9 g.), M.P. 114° C.

EXAMPLE IV

A mixture of 2-(10-methyl-3-phenthiazinyl)-hydroxypropane (8.77 g.) and succinic anhydride (3.25 g.) is heated between 115° and 130° C. for about 2 hours. The reaction mixture is allowed to cool and is then taken up in diisopropyl ether (1 cc.) and cyclohexane (120 cc.) and stirred for 6 days (the product crystallises slowly). After separation and drying, the product obtained (9.3 g.) is dissolved in diisopropyl ether (50 cc.) and cyclohexane (100 cc.) is added to the solution. An oil separates, which crystallises slowly. After separation and drying, the product obtained (6.64 g.) is dissolved in a 3% aqueous sodium bicarbonate solution (100 cc.). The solution is washed with diethyl ether and acidified with hydrochloric acid. An oil separates, which is extracted with diethyl ether, and the ethereal solution is washed with water (400 cc.), dried over anhydrous sodium sulphate and evaporated to dryness. The residue is crystallised from a mixture of diisopropyl ether (30 cc.) and cyclohexane (100 cc.) to give 2-(10-methyl-3-phenthiazinyl)propyl acid succinate (4.6 g.), M.P. 77–80° C.

EXAMPLE V

A mixture of 1-(10-methyl-3-phenthiazinyl)-2-hydroxyethane (10 g.), maleic anhydride (7.8 g.) and toluene (150 cc.) is heated under reflux for 390 minutes. The toluene solution is extracted with a 7% aqueous sodium bicarbonate solution (500 cc.). The aqueous solution is acidified with hydrochloric acid. An oil separates, which is extracted with diethyl ether. The ethereal solution is washed with water until the washing liquors are neutral, dried over anhydrous sodium sulphate and evaporated to dryness. The residue (11.4 g.) is crystallised from diisopropyl ether (22 cc.). The filtered product (8.3 g.) is recrystallised from a mixture of benzene (160 cc.) and cyclohexane (160 cc.) to give 2-(10-methyl-3-phenthiazinyl)ethyl acid maleate (7.2 g.), M.P. 96–98° C.

EXAMPLE VI

A solution of methyl (7-methoxy-10-methyl-3-phenthiazinyl)acetate (12.6 g.) in anhydrous diethyl ether (450 cc.), under nitrogen, is poured over a period of 5 minutes into a suspension of lithium aluminium hydride (1.67 g.) in anhydrous diethyl ether (100 cc.). The reaction mixture is heated under reflux for 150 minutes and cooled, and ethyl acetate (6 cc.) and then 4 N hydrochloric acid (350 cc.) are added. After filtration and decantation the aqueous solution is extracted with diethyl ether (100 cc.). The organic solutions are combined, washed to neutrality with water (300 cc.) and dried over anhydrous sodium sulphate. After concentration to dryness under reduced pressure (20 mm. Hg), there is obtained a product (12.7 g.) melting at about 90° C., which is recrystallised from diisopropyl ether (230 cc.). The resultant product (9.35 g.), melting at 93° C., is recrystallised from diisopropyl ether (210 cc.) to give 1-(7-methoxy-10-methyl-3-phenthiazinyl)-2-hydroxyethane (8.35 g.), M.P. 93° C.

The initial methyl (7-methoxy-10-methyl-3-phenthiazinyl)acetate is prepared by the method described in Example 9 of Belgian Patent No. 671,573.

EXAMPLE VII

Methyl (3-phenthiazinyl)acetate (13.55 g.) is introduced over a period of 30 minutes, under nitrogen, into a suspension of lithium aluminium hydride (3.8 g.) in anhydrous diethyl ether (500 cc.). The reaction mixture is heated under reflux for 3 hours and cooled, and ethyl acetate (10 cc.) and then 4 N hydrochloric acid (300 cc.) are added. After filtration and decantation, the aqueous solution is extracted with diethyl ether (50 cc.). The organic solutions are combined, washed to neutrality with water (300 cc.) and dried over anhydrous sodium sulphate. After concentration to dryness under reduced pressure (20 mm. Hg), there is obtained a product (12.8 g.) melting at 135–140° C., which is recrystallised from benzene (225 cc.) to give 1-(3-phenthiazinyl)-2-hydroxyethane (8.75 g.), M.P. 147° C.

The initial methyl (3-phenthiazinyl)acetate is prepared in accordance with S. P. Massie, I. Cooke and W. A. Hills, J. Org. Chem., 21, 1006 (1956).

EXAMPLE VIII

A mixture of 1-(10-methyl-3-phenthiazinyl)-2-hydroxyethane (10 g.) and ethyl chloroformate (100 cc.) is heated under reflux for 29 hours. After concentration to dryness under reduced pressure (20 mm. Hg), there is obtained an oil which is crystallised from ethanol (50 cc.). The crystals are filtered off to yield a product (8.8 g.) melting at 62–64° C. Recrystallisation from ethanol (80 cc.) gives 1 - (10 - methyl - 3 - phenthiazinyl) - 2 - ethoxycarbonyloxyethane (5.48 g.), M.P. 66–67° C.

EXAMPLE IX

A mixture of 1-(10-methyl-3-phenthiazinyl)-2-hydroxyethane (20 g.), urea (14 g.) and zinc acetate (3.1 g.) is heated for 8 hours at 150° C. The reaction mixture is taken up while hot with ethanol and the suspension obtained is poured into water (400 cc.). The crystals are filtered off, washed with water and dried to yield a solid product (22.5 g.). This product is dissolved in benzene (1650 cc.) and the solution obtained is chromatographed through alumina (440 g.). After elution with benzene, a fraction of 3 litres is collected; elution is then effected with benezene-ethyl acetate containing 10% of ethyl acetate, and a fraction of 7 litres is collected. Finally, elution is effected with ethyl acetate, and a fraction of 3 litres is collected. This last fraction is concentrated to dryness under reduced pressure (20 mm. Hg) to yield a product (8.5 g.) melting at 137° C., which is recrystallised from benzene (97 cc.). There are obtained 6.4 g. of a product, which is combined with the result of an identical operation. The combined (quantity (11.4 g.) is recrystallised from benezene (100 cc.) to give 1-(10-methyl-3-phenthiazinyl)-2-carbamoyloxyethane (10.56 g.), M.P. 138° C.

EXAMPLE X

A mixture of 1-(10-methyl-3-phenthiazinyl)-2-chlorocarbonyloxyethane (8 g.), 1-methylpiperazine (7.5 g.) and anhydrous toluene (50 cc.) is heated under reflux for 3 hours. The reaction mixture is taken up in water and diethyl ether, and the water is then decanted. The organic solution is washed to neutrality, extracted with 0.5 N hydrochloric acid (60 cc.), and the acid solution made alkaline with N sodium hydroxide (35 cc.). The oil formed is extracted with benzene, dried over anhydrous sodium sulphate and concentrated to dryness under reduce pressure (20 mm. Hg). There is obtained a solid (7.2 g.) which is recrystallised from ethyl acetate (60 cc.) to yield a product (5.39 g.) melting at 130–132° C. The mother liquors are concentrated to dryness and a solid (1.5 g.) is obtained, which is recrystallised from ethyl acetate (13 cc.) to give a product (0.97 g.) melting at 130–132° C. The two lots combined are recrystallised from ethyl acetate (30 cc.) to yield 1-(10-methyl-3-phenthiazinyl) - 2-(4-methyl-1-piperazinylcarbonyloxy)ethane (5.87 g.), M.P. 130–132° C.

1 - (10 - methyl-3-phenthiazinyl)-2-chlorocarbonyloxyethane employed as starting material is prepared as follows:

A toluene solution containing 20% of phosgene (130 cc.) is poured over a period of 105 minutes into a solution of 1-(10-methyl-3-phenthiazinyl)-2-hydroxyethane (13 g.) in anhydrous toluene (500 cc.), the temperature being maintained at about 10° C. The mixture is left to stand for 195 minutes at ambient temperature and then concentrated to dryness under reduced pressure (20 mm. Hg) to yield 1-(10-methyl-3-phenthiazinyl)-2-chlorocarbonyloxyethane (16.2 g.), which is employed in the crude state in the form of an oil.

EXAMPLE XI

A solution of diethylamine (7.76 g.) in anhydrous toluene (35 cc.) is added over a period of 12 minutes to a solution of 1-(10-methyl-3-phenthiazinyl)-2-chlorocarbonyloxyethane (11.3 g.) in anhydrous toluene (35 cc.). The reaction mixture is heated under reflux for 210 minutes and taken up in water and diethyl ether, and the water is then decanted. The organic solution is washed to neutrality, dried over anhydrous sodium sulphate and concentrated to dryness under reduce pressure (20 mm. Hg). There is obtained an oil (11.2 g.), which is dissolved in cyclohexane (560 cc.) and the solution obtained is chromatographed through alumina (224 g.). Elution is effected with cyclohexane (800 cc.), then with a cyclohexane-benzene mixture containing 20% of benzene (800 cc.), and then with a 50% cyclohexane-benzene mixture (400 cc.). The products emanating from these eluates are removed. Elution is thereafter effected with a 50% cyclohexane-benzene mixture (800 cc.) and then with benzene (5.8 litres). These eluates are combined and concentrated to dryness under a pressure of 20 mm. Hg to yield an oil (6 g.) which crystallises on scratching. This product is recrystallised from heptane (60 cc.) to give 1-(10-methyl-3-phenthiazinyl)-2-diethylaminocarbonyloxyethane (4.28 g.), M.P. 52–55° C.

The present invention includes within its scope pharmaceutical compositions containing, as active ingredient, at least one of the phenthiazine derivatives of Formula I and, in the case where $R_2$ represents an alkanoyl or alkenoyl group carrying a carboxy substituent, a pharmaceutically-acceptable salt thereof in association with a pharmaceutical carrier or coating. The invention includes especially such preparations made up for oral, parenteral or rectal administration, or topical application, e.g. as ointments or creams.

Solid compositions for oral administration include tablets, pills, powders, and granules. In such solid compositions the active compound is admixed with at least one inert diluent such as sucrose, lactose or starch. The compositions may also comprise, as is normal practice, additional substances other than inert diluents, e.g. lubricating agents, such as magnesium stearate. Liquid compositions for oral administration include pharmaceutically-acceptable emulsions, solutions, suspensions, syrups and elixirs containing inert diluents commonly used in the art, such as water and liquid paraffin. Besides inert diluents such compositions may also comprise adjuvants, such as wetting, emulsifying and suspending agents, and sweetening, flavouring and aromatizing agents. The compositions according to the invention, for oral administration, also include capsules of absorbable material such as gelatin containing the active substances with or without the addition of diluents or excipients.

Preparations according to the invention for parenteral administration include sterile aqueous or non-aqueous solutions, suspensions, or emulsions. Examples of non-aqueous solvents or vehicles are propylene glycol, polyethylene glycol, vegetable oils, such as olive oil, and injectable organic esters such as ethyl oleate. These compositions may also contain adjuvants such as wetting, emulsifying and dispersing agents. They may be sterilised by, for example, filtration through a bacteria-retaining filter, by incorporation in the compositions of sterilising agents, by irradiation, or by heating. They may also be manufactured in the form of sterile solid compositions, which can be dissolved in sterile water or some other sterile injectable medium immediately before use.

Compositions for rectal administration are suppositories which contain, in addition to the active substance, excipients such as cacao butter or a suppository wax.

The percentage of active ingredient in the compositions of the invention may be varied, it being necessary that it should constitute a proportion such that a suitable dosage shall be obtained. The dosage depends on the desired therapeutic effect, on the route of administration and on the duration of the treatment. In human therapy by oral administration the compositions should generally be administered so as to give to an adult between 0.1 and 1.0 g. of active substance per day.

The following examples illustrate pharmecutical compositions according to the invention.

EXAMPLE XII

Tablets weighing 500 mg. and having the following composition are prepared in accordance with usual methods:

| | Mg. |
|---|---|
| 1-(10-methyl-3-phenthiazinyl)-2-hydroxyethane | 250 |
| Starch | 190 |
| Colloidal silica | 50 |
| Magnesium stearate | 10 |

EXAMPLE XIII

Tablets weighing 200 mg. and having the following composition are prepared in accordance with usual methods:

| | Mg. |
|---|---|
| 2-(10-methyl-3-phenthiazinyl)ethyl acid succinate | 70 |
| Starch | 100 |
| Colloidal silica | 27 |
| Magnesium stearate | 3 |

EXAMPLE XIV

Tablets weighing 500 mg. and having the following composition are prepared in accordance with usual methods:

| | Mg. |
|---|---|
| 1-(10-methyl-3-phenthiazinyl)-2-ethoxycarbonyloxyethane | 250 |
| Starch | 190 |
| Colloidal silica | 50 |
| Magnesium stearate | 10 |

EXAMPLE XV

Tablets weighing 200 mg. and having the following composition are prepared in accordance with usual methods:

| | Mg. |
|---|---|
| 1-(3-phenthiazinyl)-2-hydroxyethane | 70 |
| Starch | 100 |
| Colloidal silica | 27 |
| Magnesium stearate | 3 |

We claim:
1. A phenthiazine derivative of the formula:

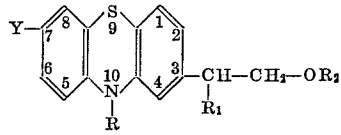

wherein R represents hydrogen or methyl, $R_1$ represents hydrogen, methyl or ethyl, $R_2$ represents hydrogen, alkanoyl or alkenoyl of 1 through 4 carbon atoms, alkanoyl or alkenoyl of 1 through 4 carbon atoms with an ω-carboxy substituent, carbamoyl, alkylcarbamoyl, dialkylcarbamoyl, alkoxycarbonyl or 4-alkyl-1-piperazinylcarbonyl, the said alkyl and alkoxy radicals having 1 through 4 carbon atoms, Y represents hydrogen or methoxy, and where $R_2$ represents alkanoyl or alkenoyl with an ω-carboxy substituent a pharmaceutically-acceptable salt thereof.

2. Phenthiazine derivative according to claim 1 wherein R and $R_1$ represent hydrogen or methyl, $R_2$ represents hydrogen, alkanoyl of 1 through 4 carbon atoms with an ω-carboxy substituent, alkoxycarbonyl, carbamoyl, dialkylcarbamoyl or 4-alkyl-1-piperazinylcarbonyl, the said alkyl and alkoxy radicals having 1 through 4 carbon atoms, and Y represents hydrogen or methoxy.

3. Phenthiazine derivative according to claim 1 wherein R and $R_1$ represent hydrogen or methyl, $R_2$ represents hydrogen, alkanoyl of 1 through 4 carbon atoms with an ω-carboxy substituent, or alkoxycarbonyl with 1 through 4 carbon atoms in the alkoxy radical, and Y represents hydrogen.

4. 1-(10-methyl-3-phenthiazinyl)-2-hydroxyethane.
5. 2-(10-methyl-3-phenthiazinyl)ethyl acid succinate.
6. 2-(10-methyl-3-phenthiazinyl)propyl acid succinate.
7. 1-(3-phenthiazinyl)-2-hydroxyethane.
8. 1-(10-methyl-3 - phenthiazinyl) - 2 - ethoxy-carbonyloxyethane.

References Cited

Canguil et al.: Bull. Soc. Chim. Fr., pp. 768–71, 777 (1955).

HENRY R. JILES, Primary Examiner

HARRY T. MOATZ, Assistant Examiner

U.S. Cl. X.R.

424—247